(12) United States Patent
Magdalin

(10) Patent No.: US 9,152,693 B1
(45) Date of Patent: Oct. 6, 2015

(54) SYSTEM AND METHOD FOR VISUAL REPRESENTATION AND SELECTION OF HIERARCHICAL DATA

(71) Applicant: Intuit Inc., Mountain View, CA (US)

(72) Inventor: Vlad Magdalin, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 237 days.

(21) Appl. No.: 13/776,293

(22) Filed: Feb. 25, 2013

(51) Int. Cl.
  *G06F 7/00* (2006.01)
  *G06F 17/30* (2006.01)

(52) U.S. Cl.
  CPC ................... *G06F 17/30598* (2013.01)

(58) Field of Classification Search
  USPC ........................................................ 707/737
  See application file for complete search history.

(56) References Cited

U.S. PATENT DOCUMENTS

2011/0261049 A1* 10/2011 Cardno et al. ............... 345/419
2011/0314028 A1* 12/2011 Radomski et al. ........... 707/748

* cited by examiner

*Primary Examiner* — Alex Gofman
*Assistant Examiner* — Muluemebet Gurmu
(74) *Attorney, Agent, or Firm* — Hawley Troxell Ennis & Hawley LLP; Philip McKay

(57) ABSTRACT

Access to hierarchical data arranged in parent/child data levels is obtained and each data level is assigned a data level display symbol. The data level display symbols associated with a common parent data level are then identified and grouped into sets of related data level display symbols. Each of the data level display symbols within each set of related data level display symbols is then assigned a weighting value that determines one or more visual emphasis parameters to be associated with the data level display symbols. All the sets of related data level display symbols are then displayed on a single user interface display screen in accordance with their assigned weighting value and associated visual emphasis parameters. Any of the data level display symbols can then be activated through the user interface display screen.

45 Claims, 7 Drawing Sheets

SYSTEM AND METHOD FOR VISUAL REPRESENTATION AND SELECTION OF HIERARCHICAL DATA

BACKGROUND

Due to the almost complete integration of processing and data storage mechanisms into virtually every aspect of modern life, there are now orders of magnitude more information available to the average human being than at any other time in human history. This abundance of data has led many to describe the current era as the "information age."

One issue associated with the massive amounts of information and data available today is how to organize the data in such a way that desired information and/or data can be relatively easily identified and accessed in a systematic and reliable way. One way data is currently arranged for relative ease of access is as hierarchical data. Hierarchical data is arranged in parent/child data levels, also known as a "one to many" data arrangement. This type of data arrangement has proven extremely useful and particularly intuitive for consumer-based systems such as, but not limited to, data categorization systems, such as menu-based systems; financial transaction categorization systems; geo-location and positional systems; audio file organizational systems, such as, but not limited to, playlists; video file organization systems, such as, but not limited to, video library and menu systems; and numerous other systems or situations where large amounts of data needs to be accessed in an efficient and intuitive way.

While hierarchical data arrangements have proven very effective, one long-standing problem associated with hierarchical data arrangements is the fact that, currently, hierarchical data is typically arranged in lists of parent data levels and one or more child data levels displayed in an outline-like, linear, and static display structure.

For relatively small amounts of data, and relatively few parent and child data levels, the system is sufficient. However, when larger numbers of data levels are present, or when a display screen is of limited size, current display implementations of hierarchical data often result in considerable user input, often in the form of the user having to scroll through multiple user interface display screens, to view all, or a sufficient number of, the data levels.

For instance, FIG. 1 shows a typically prior art hierarchical data arrangement of financial transaction category types including parent data levels, i.e., parent categories "Health & Fitness" and "Home." As seen in FIG. 1, the parent category "Health & Fitness" includes the child data levels, i.e., categories, "Dentist", "Doctor", "Eyecare", "Gym", "Health Insurance", "Pharmacy", and "Sports". It is worth noting that the user interface display screen 101 of FIG. 1 only displays a single complete set of related categories with the same parent category, i.e., "Health & Fitness." Consequently, display screen 101 of FIG. 1 only displays a very small portion of the hierarchical data and numerous user interface display screens would have to be accessed in order to see all of the hierarchical data, i.e., all the potential financial transaction categories.

As a result, when current hierarchical data arrangements are used to display even moderately long/deep lists of parent and/or child data levels, the user is often forced to either remember both the parent data level name and the child data level name, or to scroll through a long list of data level names to try and identify the parent data level, and/or the child data level name, desired.

Even in the age of desktop computing systems, and large display screens, the situation described above was considered problematic. However, with the advent of mobile computing, current hierarchical data arrangements are, at best, a nuisance to users who must scroll through multiple user interface screens, and are often impractical and unusable with mobile computing systems, such as smart phones, with their very limited display screen space. Consequently, current hierarchical data arrangements often limit a modern user's ability to efficiently and intuitively access desired data.

SUMMARY

In accordance with one embodiment, a system and method for visually representing and selecting hierarchical data includes obtaining access to hierarchical data, the hierarchical data being arranged in a one to many, e.g., parent/child, data structure with two or more data levels. Each data level within the hierarchical data is then assigned a data level display symbol. In one embodiment, the child data level display symbols associated with a common parent data level are then identified and grouped into sets of related data level display symbols.

In one embodiment, each of the data level display symbols within each set of related data level display symbols is assigned a weighting value. In one embodiment, the weighting value assigned to a particular data level display symbol determines one or more visual emphasis parameters to be associated with that data level display symbol.

In one embodiment, all the sets of related data level display symbols are then displayed on a single user interface display screen. In one embodiment, all the data level display symbols in each set of related data level display symbols are visually grouped together on the single user interface display screen and displayed in accordance with their assigned weighting value and associated visual emphasis parameters.

In one embodiment, any of the data level display symbols can then be activated through the user interface display screen and, in response to an activation of a data level display symbol, the activated data level display symbol is selected.

Figure 1:
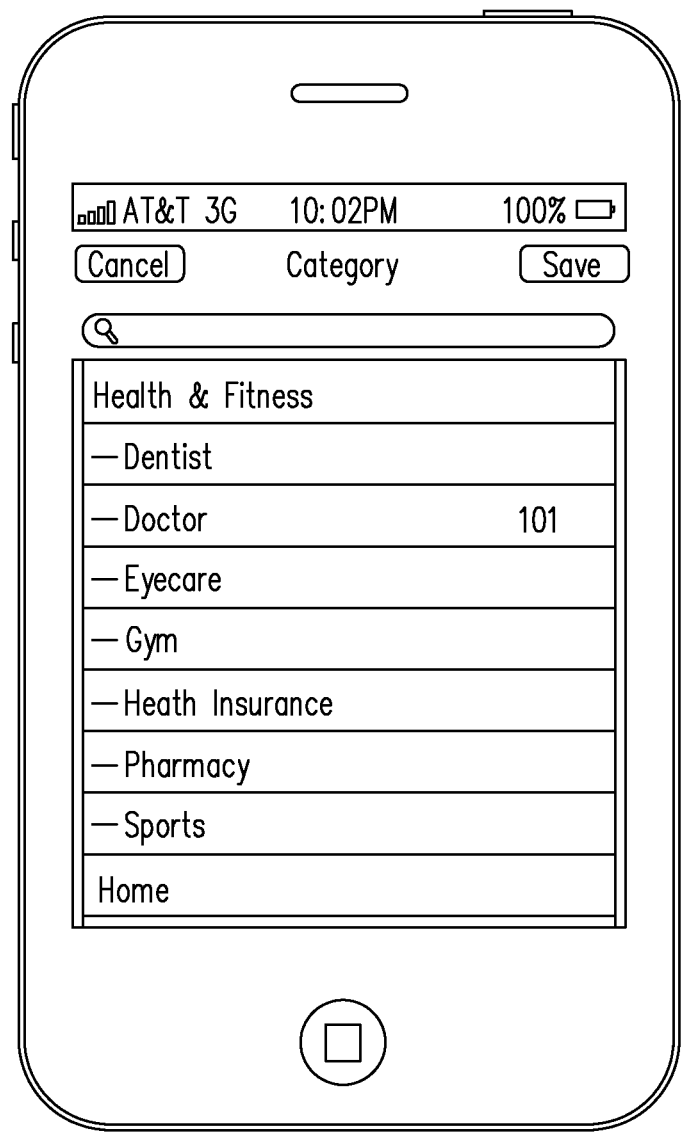
FIG. 1 shows one example a typical prior art hierarchical data arrangement display.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a system and method for visually representing and selecting hierarchical data includes a process for visually representing and selecting hierarchical data implemented by one or more processors associated with one more computing systems.

As used herein, the term "computing system", includes, but is not limited to, a desktop computing system; a portable computing system; a mobile computing system; a laptop computing system; a notebook computing system; a tablet computing system; a workstation; a server computing system; a mobile phone; a smart phone; a wireless telephone; a two-way pager; a Personal Digital Assistant (PDA); a media player, i.e., an MP3 player and/or other music and/or video player; an Internet appliance; or any device that includes components that can execute all, or part, of any one of the processes and/or operations as described herein. In addition, as used herein, the term computing system can denote, but is not limited to, systems made up of multiple desktop computing systems; portable computing systems; mobile computing systems; laptop computing systems; notebook computing systems; tablet computing systems; workstations; server computing systems; smart phones; wireless telephones; two-way pagers; Personal Digital Assistants (PDAs); media players; Internet appliances; or any devices that can be used to perform the processes and/or operations as described herein.

In one embodiment, one or more computing systems are connected by one or more communications channels, such as, but not limited to: any general network, communications network, or general network/communications network system; a cellular network; a wireless network; a combination of different network types; a public network; a private network; a satellite network; a POTS network; a cable network; or any other network capable of allowing communication between two or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a POTS network; any general network, communications network, or general network/communications network system; a wireless network; a wired network; a wireless and wired combination network; a satellite network; a cable network; any combination of different network types; or any other system capable of allowing communication between two or more computing systems, whether available or known at the time of filing or as later developed.

In one embodiment, the process for visually representing and selecting hierarchical data includes obtaining access to hierarchical data, the hierarchical data being arranged in a one to many, e.g., parent/child, data structure with two or more data levels.

As noted above, one way data is currently arranged for relative ease of access is as hierarchical data. Hierarchical data is typically arranged in parent/child data levels, also known as a "one to many" data arrangement. This type of data arrangement has proven extremely useful and particularly intuitive for systems such as, but not limited to, data categorization systems, such as menu-based systems; financial transaction categorization systems; geo-location and positional systems; audio file organizational systems, such as, but not limited to, playlists; video file organization systems, such as, but not limited to, video library and menu systems; and numerous other systems or situations where large amounts of data needs to be accessed in an efficient and intuitive way.

As also noted above, while hierarchical data arrangements have proven very effective, one long-standing problem associated with hierarchical data arrangements is the fact that, currently, hierarchical data is typically arranged in lists of parent data levels and one or more child data levels associated with each parent data level displayed in an outline-like, linear, and static display structure.

For relatively small amounts of data, and relatively few parent and child data levels, the system is sufficient. However, when larger numbers of data levels are present, or when a display screen is of limited size, current implementations of hierarchical data often result in considerable user input, often in the form of the user having to scroll through multiple user interface display screens, to view all, or a sufficient number of, the data levels.

To address this problem, in one embodiment, each data level within the hierarchical data is assigned a display symbol and the resulting data level display symbols associated with a common parent data level are then identified and grouped into sets of related data level display symbols. In one embodiment, each of the data level display symbols within each set of related data level display symbols is assigned a weighting value that determines one or more visual emphasis parameters to be associated with that data level display symbol.

In one embodiment, all the sets of related data level display symbols are then displayed on a single user interface display screen. In one embodiment, all the data level display symbols in each set of related data level display symbols are sized to fit in a single user interface display screen and then visually grouped together on the single user interface display screen and displayed with visual emphasis in accordance with their assigned weighting value and associated visual emphasis parameters.

To this end, in one embodiment, each data level within the hierarchical data is assigned a display symbol. In various embodiments, the assigned display symbols include, but are not limited to, one or more alpha numeric symbols representing the name, or content, of the data level within the hierarchical data. In other embodiments, the assigned display symbols can be any symbol, icon, or other visual feature, as discussed herein, and/or as known in the art at the time of filing, and/or as developed after the time of filing.

In one embodiment, the data level display symbols representing types, or levels, of hierarchical data, e.g., child data levels, associated with a common parent data level, are then identified and grouped into sets of related data level display symbols. As discussed below, the related data level display symbols in each set of related data level display symbols are marked, or linked, for display in the same general location on a user interface display screen.

In one embodiment, each of the data level display symbols within each set of related data level display symbols is assigned a weighting value.

In one embodiment, the weighting value to be assigned to a given data level display symbol is calculated based, at least in part, on how many, if any, child data levels are associated with the data level represented by the given data level display symbol, i.e., how many data levels claim the data level represented by the given data level display symbol as a parent data level.

For instance, as a specific illustrative example, the weighting value to be assigned to a given data level display symbol is larger if the given data level display symbol has several child data level display symbols than if the given data level display symbol has fewer, or no, child data level display symbols.

In one embodiment, the weighting value to be assigned to a given data level display symbol is calculated based, at least in part, on how many times the given data level display symbol has been chosen as the desired data level display symbol by one or more users of the process for visually representing and selecting hierarchical data.

For instance, as a specific illustrative example, in one embodiment, historical use data is gathered and maintained indicating how many times each data level display symbol is selected by a group of users of the process for visually representing and selecting hierarchical data. Then, in one embodiment, the weighting value to be assigned to a given data level display symbol is larger for a given data level display symbol that has been selected as the desired data level display symbol relatively frequently and smaller for a given data level display symbol that has been selected as the desired data level display symbol less frequently.

As another specific illustrative example, in one embodiment, historical use data is gathered and maintained indicating how many times each data level display symbol is selected by a particular user of the process for visually representing and selecting hierarchical data, such as the current user of the process for visually representing and selecting hierarchical data. Then, in one embodiment, the weighting value to be assigned to a given data level display symbol is larger for a given data level display symbol that has been selected as the desired data level display symbol relatively frequently and smaller for a given data level display symbol that has been selected as the desired data level display symbol less frequently.

In one embodiment, the weighting value to be assigned to a given data level display symbol is calculated based, at least in part, on profile data collected and maintained for the current user of the process for visually representing and selecting hierarchical data.

For instance, as a specific illustrative example, in one embodiment, profile data is collected and/or obtained indicating the current user's preferences, interests, and likely uses of the process for visually representing and selecting hierarchical data. As a more specific illustrative example, assume profile data is obtained indicating a given user is an avid scuba diver and frequently travels to Monterey Calif. for diving. In this instance, if a parent data level symbol is "recreation" and child data level symbols are "hiking", "fishing", and "bicycling" and "scuba", then, in this specific illustrative example, the child data level symbol "scuba" is given the higher weighting value, perhaps even higher than the weighting value assigned to the parent data level symbol "recreation." As another specific illustrative example, assume the parent data level symbol is "travel" and a first child data level symbol is "Monterey" and two second child data level symbols under "Monterey" are "business" and "personal." Then, in this specific illustrative example, the second level child data level symbol "personal" would be given a higher weighting value, perhaps even higher than the weighting value assigned to the parent data level symbols "Monterey" or "travel".

In one embodiment, the weighting value to be assigned to a given data level display symbol is calculated based, at least in part, on contextual data for the current user of the process for visually representing and selecting hierarchical data.

For instance, as a specific illustrative example, in one embodiment, assume a financial management system uses the process for visually representing and selecting hierarchical data to display potential financial transaction categories for an uncategorized financial transaction, with each data level display symbol representing a potential categorization. Further assume a currently selected financial transaction shows "Bob's Grill Emporium" as the payee of the financial transaction. In this specific illustrative example, the data level display symbol "Shopping" (for grills) and data level display symbol "Restaurants" (for bar & grill) are assigned higher weighting values than other data level display symbols.

In various embodiments, any combination of the above methods for calculating a weighting value to be assigned to a given data level display symbol are used. In various embodiments, any other methods for calculating a weighting value to be assigned to a given data level display symbol are used.

In one embodiment, the weighting value assigned to a particular data level display symbol determines one or more visual emphasis parameters to be associated with that data level display symbol.

In various embodiments, the visual emphasis parameters are used to visually highlight selected data level display symbols on a user interface display screen, as discussed in more detail below.

In one embodiment, the visual emphasis parameters dictate the size of the data level display symbols that will appear on the user interface display screen. For instance, in one embodiment, the larger the weighting value assigned to a data level display symbol, the larger the data level display symbol will appear on the user interface display screen.

In one embodiment, the visual emphasis parameters dictate the color of the data level display symbols that will appear on the user interface display screen. For instance, in one embodiment, a larger weighting value assigned to a data level display symbol results in a brighter, or designated, display color for the data level display symbol on the user interface display screen.

In one embodiment, the visual emphasis parameters dictate the font of the data level display symbols that will appear on the user interface display screen. For instance, in one embodiment, a larger weighting value assigned to a data level display symbol results in a highlighted, or designated, font for the data level display symbol on the user interface display screen.

In one embodiment, the visual emphasis parameters dictate animation of the data level display symbols that will appear on the user interface display screen. For instance, in one embodiment, a larger weighting value assigned to a data level display symbol results in a moving, or otherwise animated, data level display symbol on the user interface display screen.

In one embodiment, the visual emphasis parameters dictate the display position of the data level display symbols on the user interface display screen. For instance, in one embodiment, a larger weighting value assigned to a data level display symbol results in a centralized, or dedicated, position for the data level display symbol on the user interface display screen.

In various embodiments, the visual emphasis parameters dictate any other visually distinguishing features to be associated with data level display symbols on the user interface display screen, as discussed herein, and/or as known/made available in the art at the time of filing, and/or as developed after the time of filing.

In one embodiment, once sets of related data level display symbols are identified and weighting values are assigned to each data level display symbol in each set of related data level display symbols to determine visual emphasis parameters for each data level display symbol in each set of related data level display symbols, all the sets of related data level display symbols are then sized and displayed on a single user interface display screen.

In one embodiment, all the data level display symbols are sized so that all of the data level display symbols can be displayed in a single user interface display screen.

In one embodiment, all the data level display symbols in each set of related data level display symbols are visually grouped together on the single user interface display screen and displayed in accordance with their assigned weighting value and associated visual emphasis parameters.

As a specific illustrative example, in one embodiment, data level display symbols representing parent or "top" data levels are sorted alphabetically from top to bottom on the user interface display screen with the data level display symbols representing child, or "lower" data levels scattered, or clustered, around the general location on the user interface display screen of the data level display symbols representing their respective parent or "top" data levels.

As noted above, in one illustrative embodiment, if a data level display symbol has been previously selected, it's visual prominence (size) is increased in the user interface display screen, even to the point where it can become bigger than the data level display symbols representing its respective parent or "top" data level. As an even more specific illustrative example, if the data level display symbol "Gas", which represents a data level that is a child with respect to the data level display symbol "Auto & Transport", is often selected by a user, then the data level display symbol "Gas" can actually be displayed in the user interface display screen larger than the data level display symbol "Auto & Transport."

As also noted above, color can be used to emphasize, or de-emphasize, certain data level display symbols in the user interface display screen. As a specific illustrative example, if the data level display symbol "Classical" is rarely chosen as an audio file category in an audio file menu, then, in one illustrative example, the data level display symbol "Classical" can not only be displayed as a smaller data level display symbol, but also as a lighter, or grayed out, data level display symbol.

In one embodiment, once all data level display symbols are displayed on the user interface display screen, any of the data level display symbols can then be activated through the user interface display screen and, in response to an activation of a data level display symbol, the activated data level display symbol is selected.

In one embodiment, the data level display symbols can be activated using any user interface device such as, but not limited to, a touch screen, stylus, keyboard, voice command, or any other procedure, process, or mechanism, for translating user actions into one or more processor instructions and/or actions, as discussed herein, and/or as known/available in the art at the time of filing, and/or as developed/made available after the time of filing.

In one embodiment, when a data level display symbol is activated by, for instance, a single "Tap and Release" action, that data level display symbol is immediately selected.

In one embodiment, when a data level display symbol is activated by, for instance, a "Tap and Hold" action, that data level display symbol, and all, or part, of the surrounding related data level display symbols in the same set of related data level display symbols is zoomed in on in the user interface display screen to provide a more granular, and/or larger, view. Then, the user can place the cursor over a desired data level display symbol and perform a "Release" action to select the desired data level display symbol.

In one embodiment, the user can also "Drag and Drop" data level display symbols into a new general area of the user interface display screen to either select a more specific data level display symbol or to add a data level display symbol to a different set of related data level display symbols.

In various embodiments, the data level display symbols, and sets of related data level display symbols, can be manipulated in any way desired by the user and/or the provider of the process for visually representing and selecting hierarchical data, as discussed herein, and/or as known in the art at the time of filing, and/or as developed after the time of filing.

In one embodiment, the process for visually representing and selecting hierarchical data is implemented as a custom iOS control to be embedded into any existing application such as, but not limited to, financial management systems where the process for visually representing and selecting hierarchical data can be used to categorize financial transactions; data management systems where the process for visually representing and selecting hierarchical data is used to present various menu items, such as, but not limited to, services, invoices, customers, playlists, etc.; payroll management systems where the process for visually representing and selecting hierarchical data is used present payroll data by department, location, salary vs. hourly employees, etc.; geo-graphic location and position systems where the process for visually representing and selecting hierarchical data can be used to present locations and location categories such as country, state, county, city, postal code, etc.; and/or any other data management systems, as discussed herein, and/or as known in the art at the time of filing, and/or as developed after the time of filing.

Using the system and method for visually representing and selecting hierarchical data discussed herein, data level display symbols representing all data levels of hierarchical data are displayed in a single user interface display screen with sets of related data level display symbols being displayed in the same portion of the user interface display screen and with specified data level display symbols being visually emphasized in the single user interface display screen. Consequently, the system and method for visually representing and selecting hierarchical data discussed herein provides a user with a single display of all the hierarchical data and the capability to select the desired hierarchical data, in one embodiment, by a single tap of the data level display symbol representing the desired hierarchical data.

As a result, the system and method for visually representing and selecting hierarchical data discussed herein provides a mechanism for displaying and selecting hierarchical data that is efficient, intuitive, and that is well suited to mobile computing systems with their restricted screen space and often limited user interface capabilities.

Hardware System Architecture

Figure 2:
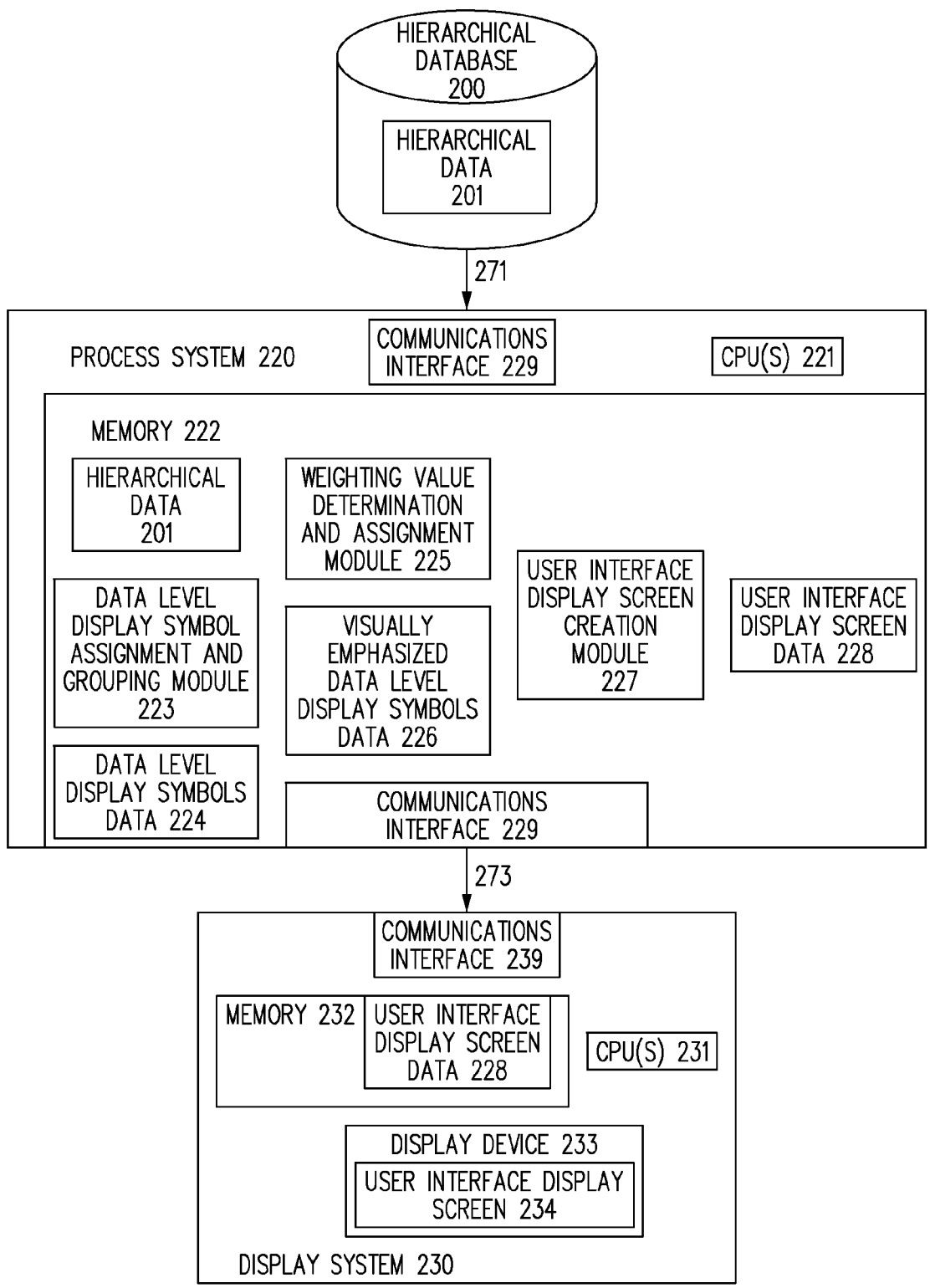
FIG. 2 is a block diagram of an exemplary hardware architecture for implementing one embodiment.

FIG. 2 is a block diagram of an exemplary hardware architecture for implementing one embodiment of a process for visually representing and selecting hierarchical data, such as exemplary process 400 (FIG. 4) discussed herein.

FIG. 2 includes hierarchical database 200, e.g., a database including/containing hierarchical data 201; process system 220, e.g., a computing system associated with a provider of a process for visually representing and selecting hierarchical data; display system 230, e.g., a computing system where hierarchical data is to be displayed; and communications channels 271 and 273.

As seen in FIG. 2, hierarchical database 200 includes hierarchical data 201 such as any hierarchical data discussed herein, and/or as known available in the art at the time of filing, and/or as developed after the time of filing. Hierarchical database 200 can be any database and/or computing system discussed herein, and/or as known in the art at the time of filing, and/or as developed after the time of filing.

As used herein, the term "database" includes, but is not limited to, any data storage mechanism known at the time of filing, or as developed thereafter, such as, but not limited to, a hard drive or memory; a designated server system or computing system, or a designated portion of one or more server systems or computing systems; a server system network; the Internet; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as discussed herein, known at the time of filing, or as developed thereafter.

As discussed herein, hierarchical data 201 is typically arranged in parent/child data levels, also known as a "one to many" data arrangement. This type of data arrangement has proven extremely useful and particularly intuitive for systems such as, but not limited to, data categorization systems, such as menu-based systems; financial transaction categorization systems; geo-location and positional systems; audio file organizational systems, such as, but not limited to, playlists; video file organization systems, such as, but not limited to, video library and menu systems; and numerous other systems or situations where large amounts of data needs to be accessed in an efficient and intuitive way.

While a single hierarchical database 200 is shown in FIG. 2, those of skill in the art will readily recognize that hierarchical database 200 is representative of any number of hierarchical databases. Consequently, in various embodiments, there can be more than the single hierarchical database 200 shown in FIG. 2.

As also seen in FIG. 2, process system 220 typically includes one or more processor/Central Processing Units (CPUs) 221, a memory 222, and a communications interface 229.

Process system 220 can be any computing system as discussed herein, and/or as known in the art at the time of filing, and/or as developed thereafter, that includes components that can execute all, or part, of a process for visually representing and selecting hierarchical data in accordance with at least one of the embodiments as described herein.

In one embodiment, memory 222 includes all, or part, of hierarchical data 201, as received from hierarchical database 200.

In one embodiment, memory 222 includes all, or part, of data level display symbol assignment and grouping module 223. As discussed below, data level display symbol assignment and grouping module 223 assigns each data level within hierarchical data 201 a data level display symbol and the resulting data level display symbols associated with a common parent data level are then identified and grouped into sets of related data level display symbols. The resulting data level display symbols and sets of related data level display symbols are then stored as data level display symbols data 224.

In one embodiment, memory 222 includes all, or part, of weighting value determination and assignment module 225. As discussed below, in one embodiment, for each of the data level display symbols within each set of related data level display symbols of data level display symbols data 224, weighting value determination and assignment module 225 calculates and assigns a weighting value that determines one or more visual emphasis parameters to be associated with that data level display symbol. The resulting visually emphasized data level display symbols are stored as visually emphasized data level display symbols data 226.

In one embodiment, memory 222 includes all, or part, of user interface display screen creation module 227. In one embodiment, user interface display screen creation module 227 generates user interface display screen data 228 which, in turn, is used to display all the sets of related data level display symbols of visually emphasized data level display symbols data 226 on a single user interface display screen, such as user interface display screen 234 of display device 233 of display system 230.

In one embodiment, user interface display screen creation module 227 generates user interface display screen data 228 such that all the data level display symbols in each set of related data level display symbols are visually grouped together on the single user interface display screen 234 and displayed with visual emphasis in accordance with their assigned weighting value and associated visual emphasis parameters.

Process system 220 may further include standard user interface devices such as a keyboard (not shown), a mouse (not shown), a printer (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, a computing system, whether available or known at the time of filing or as later developed.

As also seen in FIG. 2, display system 230 includes CPU(s) 231, memory 232, display device 233, and communications interface 239.

In various embodiments, display system 230 can be any computing system as discussed herein, and/or as known in the art at the time of filing, and/or as developed thereafter, that includes components that can execute all, or part, of a process for visually representing and selecting hierarchical data in accordance with at least one of the embodiments as described herein.

As seen in FIG. 2, memory 232 includes user interface display screen data 228, as received form process system 220, which, as discussed below, is used to display all the sets of related data level display symbols of visually emphasized data level display symbols data 226 on single user interface display screen 234 of display device 233.

In one embodiment, user interface display screen data 228 generates all the data level display symbols in each set of related data level display symbols as visually grouped together on the single user interface display screen 234 and displayed with visual emphasis in accordance with their assigned weighting value and associated visual emphasis parameters.

Display system 230 may further include standard user interface devices such as a keyboard (not shown), a mouse (not shown), a printer (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, a computing system, whether available or known at the time of filing or as later developed.

In one embodiment, one, or both, of communications channels 271 and 273 can be, but are not limited to: any network; a mobile communication link, such as a mobile phone link; a land-line phone link; a cable-based communications channel; a satellite communications channel; the Internet, a cloud, or other network communications channel; and/or any other communications channel, or combination of communications channels, as discussed herein, and/or as known in the art at the time of filing, and/or as developed after the time of filing.

In one embodiment, hierarchical database 200, and/or process system 220, and/or display system 230 are part of a cloud computing environment.

Those of skill in the art will readily recognize that the components shown in FIG. 2, and their respective sub-components, are shown for illustrative purposes only and that architectures with more or fewer components can implement, and benefit from, the invention. In addition, the particular type of, and configuration of, hierarchical database 200, and/or process system 220, and/or display system 230 are not relevant.

In various embodiments, the elements shown in FIG. 2 are grouped into one or more processes, or sub-processes, used to implement all, or part of, a process for visually representing and selecting hierarchical data, such as exemplary process 400 (FIG. 4) discussed herein.

Figure 3A:
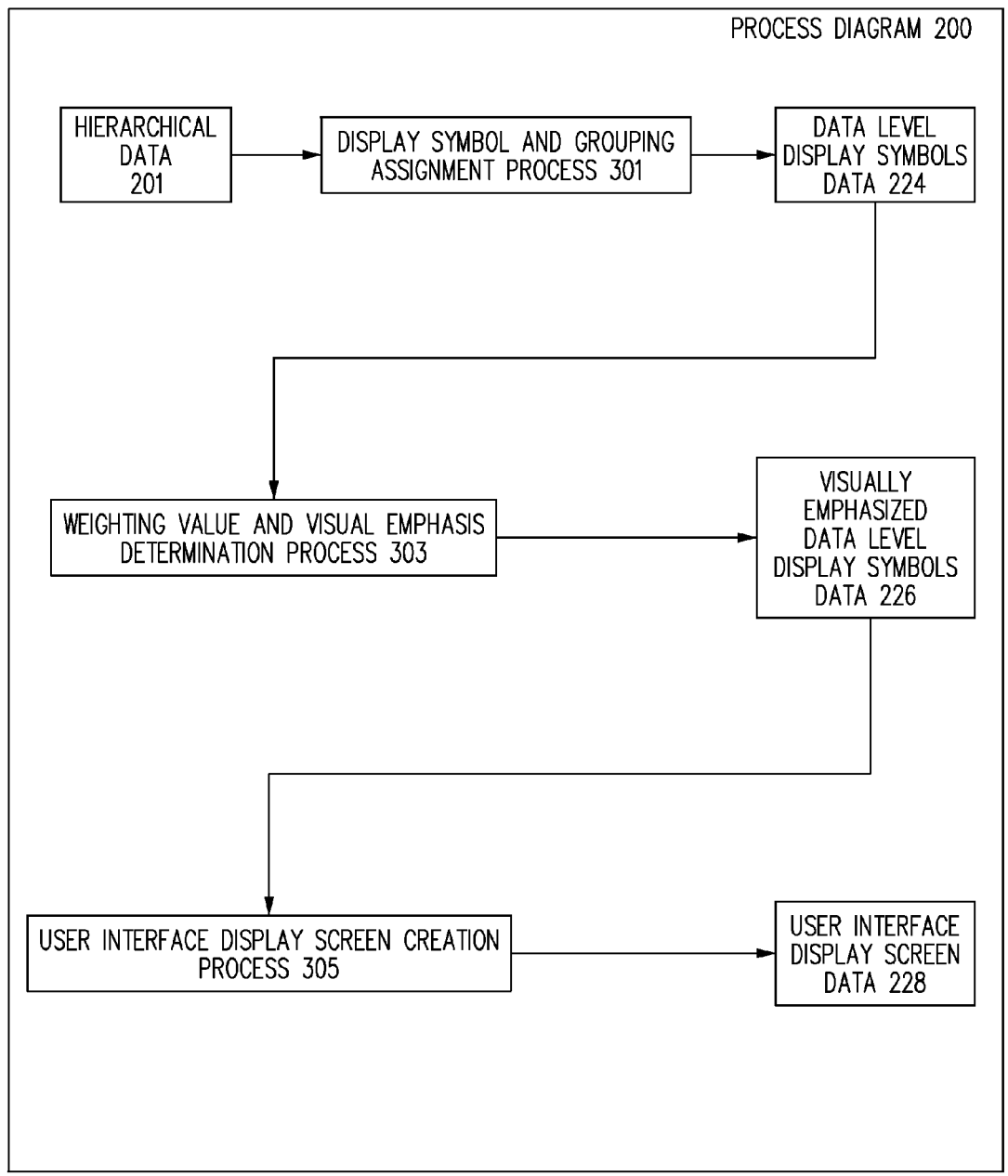
FIG. 3A is a process diagram of part of a process for visually representing and selecting hierarchical data in accordance with one embodiment.

FIG. 3A is a process diagram showing one illustrative example of the interaction of various illustrative processes, or sub-processes, 301, 303, and 307 used to implement all, or part of, a process for visually representing and selecting hierarchical data.

Figure 3B:
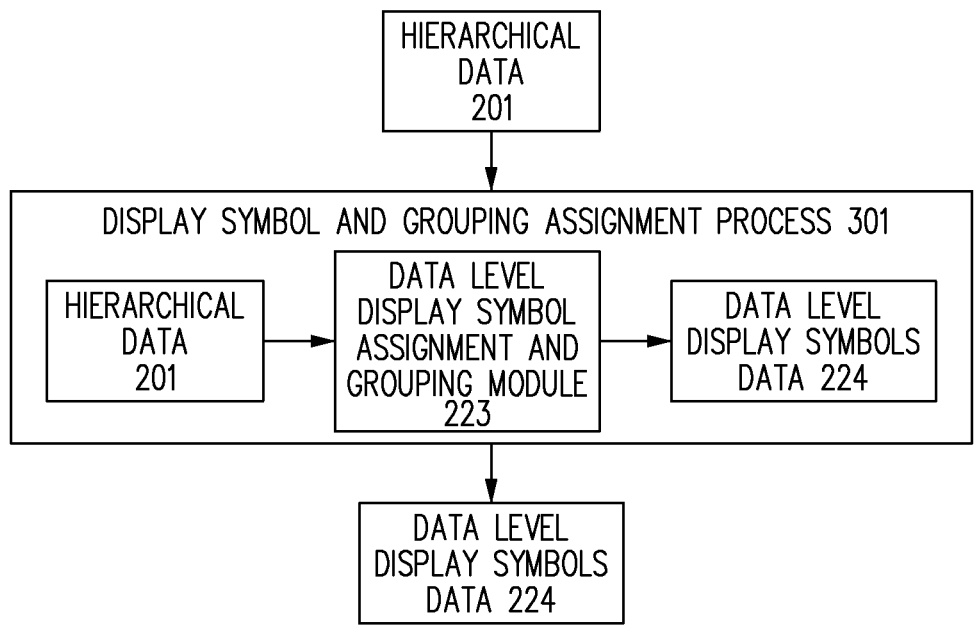
FIG. 3B shows a display symbol and grouping assignment process in accordance with one embodiment.
Figure 3C:
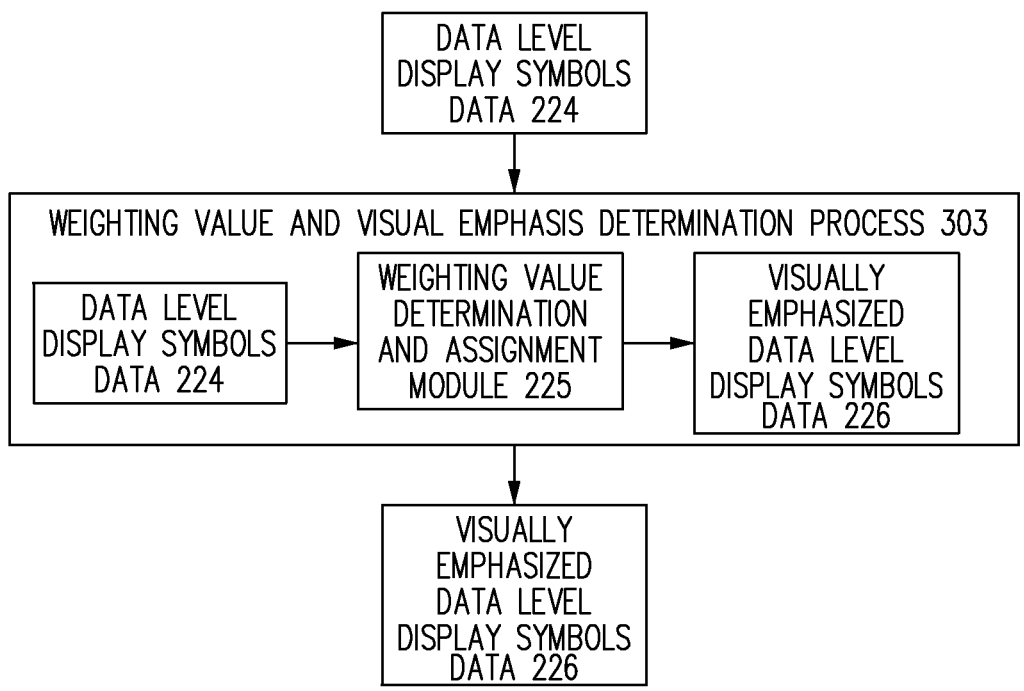
FIG. 3C shows a weighting value and visual emphasis determination process in accordance with one embodiment.
Figure 3D:
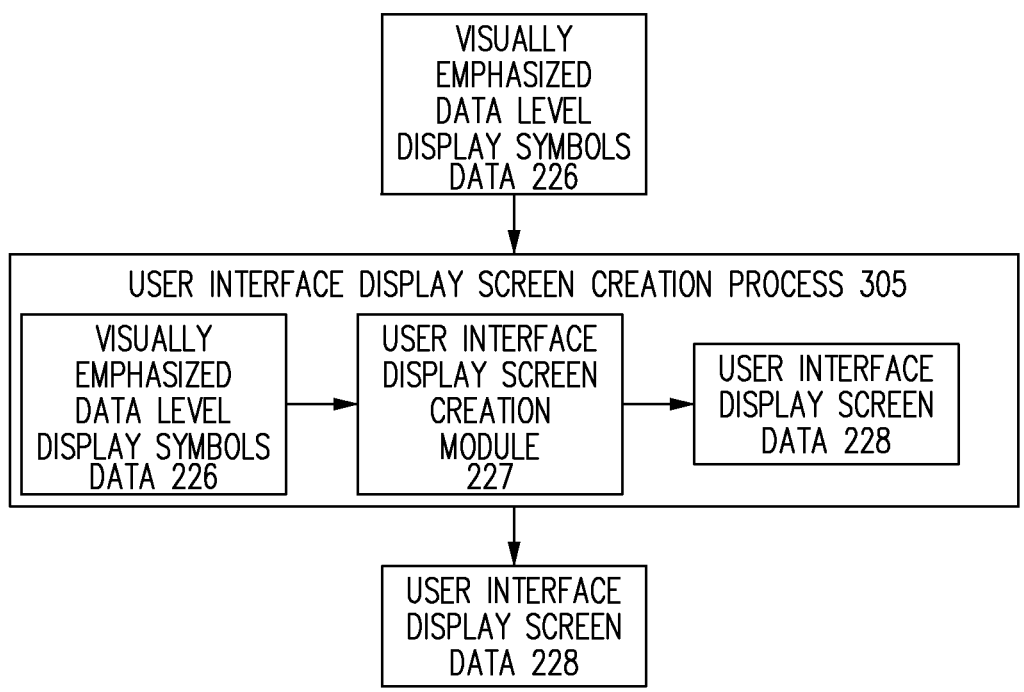
FIG. 3D shows a user interface display screen creation process in accordance with one embodiment.

FIGS. 3B, 3C, and 3D show illustrative examples of processes 301, 303, and 305 in accordance with one embodiment.

Referring to FIG. 2, FIG. 3A, FIG. 3B, FIG. 3C, and FIG. 3D together, hierarchical data 201 is provided to display symbol and grouping assignment process 301 which generates data level display symbols data 224. FIG. 3B shows display symbol and grouping assignment process 301 in more detail.

As seen in FIG. 3B, hierarchical data 201 is used as input data to data level display symbol assignment and grouping module 223 which transforms at least part of hierarchical data 201 into data level display symbols data 224.

In one embodiment, at data level display symbol assignment and grouping module 223 each data level within hierarchical data 201 is assigned a display symbol. In various embodiments, the assigned display symbols include, but are not limited to, one or more alpha numeric symbols representing the name, or content, of the data level within the hierarchical data. In other embodiments, the assigned display symbols can be any symbol, icon, or other visual feature, as discussed herein, and/or as known in the art at the time of filing, and/or as developed after the time of filing.

In one embodiment, at data level display symbol assignment and grouping module 223 the data level display symbols representing types, or levels, of hierarchical data, e.g., child data levels associated with a common parent data level, are then identified and grouped into sets of related data level display symbols. As discussed below, the related data level display symbols in each set of related data level display symbols are marked, or linked, for display in the same general location on a user interface display screen.

In one embodiment, the assigned data level display symbols and sets of related data level display symbols are stored as data level display symbols data 224 by data level display symbol assignment and grouping module 223 under the direction one or more processors, such as CPU 221 of FIG. 2, associated with one or more computing systems, such as process system 220 of FIG. 2.

Referring back to FIG. 2, FIG. 3A, FIG. 3B, FIG. 3C, and FIG. 3D together, data level display symbols data 224 is provided as input to weighting value and visual emphasis determination process 303 which generates visually emphasized data level display symbols data 226. Weighting value and visual emphasis determination process 303 is shown in more detail in FIG. 3C.

As seen in FIG. 3C, data level display symbols data 224 is used as input data for weighting value determination and assignment module 225 which transforms at least part of data level display symbols data 224 into visually emphasized data level display symbols data 226.

In one embodiment, weighting value determination and assignment module 225 calculates and assigns each of the data level display symbols within each set of related data level display symbols of data level display symbols data 224 a weighting value.

In one embodiment, the weighting value to be assigned to a given data level display symbol of data level display symbols data 224 is calculated by weighting value determination and assignment module 225 based, at least in part, on how many, if any, child data levels are associated with the data level represented by the given data level display symbol, i.e., how many data levels claim the data level represented by the given data level display symbol as a parent data level.

In one embodiment, the weighting value to be assigned to a given data level display symbol of data level display symbols data 224 is calculated by weighting value determination and assignment module 225 based, at least in part, on how many times the given data level display symbol has been chosen as the desired data level display symbol by one or more users of the process for visually representing and selecting hierarchical data.

In one embodiment, the weighting value to be assigned to a given data level display symbol of data level display symbols data 224 is calculated by weighting value determination and assignment module 225 based, at least in part, on profile data collected and maintained for the current user of the process for visually representing and selecting hierarchical data.

In one embodiment, the weighting value to be assigned to a given data level display symbol of data level display symbols data 224 is calculated by weighting value determination and assignment module 225 based, at least in part, on contextual data for the current user of the process for visually representing and selecting hierarchical data.

In various embodiments, any combination of the above methods for calculating a weighting value to be assigned to a given data level display symbol of data level display symbols data 224 are used by weighting value determination and assignment module 225. In various embodiments, any other methods for calculating a weighting value to be assigned to a given data level display symbol are used by weighting value determination and assignment module 225.

In one embodiment, the weighting value assigned to a particular data level display symbol of data level display symbols data 224 by weighting value determination and assignment module 225 determines one or more visual emphasis parameters to be associated with that data level display symbol of data level display symbols data 224.

In various embodiments, the visual emphasis parameters are used to visually highlight selected data level display symbols on a user interface display screen, as discussed in more detail below.

In one embodiment, the visual emphasis parameters dictate the size of the data level display symbols that will appear on the user interface display screen. For instance, in one embodiment, the larger the weighting value assigned to a data level display symbol by weighting value determination and assignment module 225, the larger the data level display symbol will appear on the user interface display screen.

In one embodiment, the visual emphasis parameters dictate the color of the data level display symbols that will appear on the user interface display screen. For instance, in one embodiment, a larger weighting value assigned to a data level display symbol by weighting value determination and assignment module 225 results in a brighter, or designated, display color for the data level display symbol on the user interface display screen.

In one embodiment, the visual emphasis parameters dictate the font of the data level display symbols that will appear on the user interface display screen. For instance, in one embodiment, a larger weighting value assigned to a data level display symbol by weighting value determination and assignment module 225 results in a highlighted, or designated, font for the data level display symbol on the user interface display screen.

In one embodiment, the visual emphasis parameters dictate animation of the data level display symbols that will appear on the user interface display screen. For instance, in one embodiment, a larger weighting value assigned to a data level display symbol by weighting value determination and assignment module 225 results in a moving, or otherwise animated, data level display symbol on the user interface display screen.

In one embodiment, the visual emphasis parameters dictate the display position of the data level display symbols on the user interface display screen. For instance, in one embodiment, a larger weighting value assigned to a data level display symbol by weighting value determination and assignment module 225 results in a centralized, or dedicated, position for the data level display symbol on the user interface display screen.

In various embodiments, the visual emphasis parameters dictate any other visually distinguishing features to be associated with data level display symbols on the user interface display screen, as discussed herein, and/or as known/made available in the art at the time of filing, and/or as developed after the time of filing.

In one embodiment, data representing the data level display symbols and their associated visual emphasis parameters, as determined by the weighting value assigned by weighting value determination and assignment module 225, is stored as visually emphasized data level display symbols data 226.

Referring back to FIG. 2, FIG. 3A, FIG. 3B, FIG. 3C, and FIG. 3D together, visually emphasized data level display symbols data 226 is provided to user interface display screen creation process 305 which generates user interface display screen data 228. FIG. 3D shows user interface display screen creation process 305 in more detail.

As seen in FIG. 3D, visually emphasized data level display symbols data 226 is used as input data to user interface display screen creation module 227 which transforms at least part of visually emphasized data level display symbols data 226 into user interface display screen data 228.

In one embodiment, at user interface display screen creation module 227 all the data level display symbols of visually emphasized data level display symbols data 226 are sized so that all of the data level display symbols can be displayed in a single user interface display screen.

In one embodiment, at user interface display screen creation module 227 all the sets of related data level display symbols of visually emphasized data level display symbols data 226 are then stored as user interface display screen data 228 and used to display all the sets of related data level display symbols of visually emphasized data level display symbols data 226 on a single user interface display screen.

In one embodiment, user interface display screen data 228 is used to display all the sets of related data level display symbols of visually emphasized data level display symbols data 226 on a single user interface display screen such that all the data level display symbols in each set of related data level display symbols are visually grouped together on the single user interface display screen and displayed in accordance with their assigned weighting value and associated visual emphasis parameters.

As a specific illustrative example, in one embodiment, data level display symbols representing parent or "top" data levels are sorted alphabetically from top to bottom on the user interface display screen with the data level display symbols representing child, or "lower" data levels scattered, or clustered, around the general location on the user interface display screen of the data level display symbols representing their respective parent or "top" data levels.

As noted above, in one illustrative embodiment, if a data level display symbol has been previously selected, it's visual prominence (size) is increased in the user interface display screen, even to the point where it can become bigger than the data level display symbols representing its respective parent or "top" data level. As an even more specific illustrative example, if the data level display symbol "Gas", which represents a data level that is a child with respect to the data level display symbol "Auto & Transport", is often selected by a user, then the data level display symbol "Gas" can actually be displayed in the user interface display screen larger than the data level display symbol "Auto & Transport."

As also noted above, color can be used to emphasize, or de-emphasize, certain data level display symbols in the user interface display screen. As a specific illustrative example, if the data level display symbol "Classical" is rarely chosen as an audio file category in an audio file menu, then, in one illustrative example, the data level display symbol "Classical" can not only be displayed as a smaller data level display symbol, but also as a lighter, or grayed out, data level display symbol.

In the discussion above, certain aspects of one embodiment include processes, sub-processes, steps, operations and/or instructions described herein for illustrative purposes in a particular order and/or grouping. However, the particular order and/or grouping shown and discussed herein are illustrative only and not limiting. Those of skill in the art will recognize that other orders and/or grouping of the processes, sub-processes, steps, operations and/or instructions are possible and, in some embodiments, one or more of the processes, sub-processes, steps, operations and/or instructions discussed above can be combined and/or deleted. In addition, portions of one or more of the processes, sub-processes, steps, operations and/or instructions can be re-grouped as portions of one or more other of processes, sub-processes, steps, operations and/or instructions discussed herein. Consequently, the particular order and/or grouping of the processes, sub-processes, steps, operations and/or instructions discussed herein do not limit the scope of the invention as claimed below.

Process

In accordance with one embodiment, a process for visually representing and selecting hierarchical data includes obtaining access to hierarchical data, the hierarchical data being arranged in a one to many, e.g., parent/child, data structure with two or more data levels.

In one embodiment, each data level within the hierarchical data is then assigned a display symbol such as, but not limited to, one or more alpha numeric symbols representing the name or content of the data level within the hierarchical data. In one embodiment, all the data level display symbols are sized so that all of the data level display symbols can be displayed in a single user interface display screen. In one embodiment, the data level display symbols associated with a common parent data level are then identified and grouped into sets of related data level display symbols.

In one embodiment, each of the data level display symbols within each set of related data level display symbols is assigned a weighting value. In one embodiment, the weighting value assigned to a particular data level display symbol determines one or more visual emphasis parameters, such as, but not limited to, the data level display symbol size, color, font, position, or an animation, that is to be associated with the data level display symbol.

In one embodiment, all the sets of related data level display symbols are then displayed on a single user interface display screen. In one embodiment, all the data level display symbols in each set of related data level display symbols are visually grouped together on the single user interface display screen and displayed in accordance with their assigned weighting value and associated visual emphasis parameters.

In one embodiment, any of the data level display symbols can then be activated through the user interface display screen and, in response to an activation of a data level display symbol, the activated data level display symbol is selected.

Figure 4:
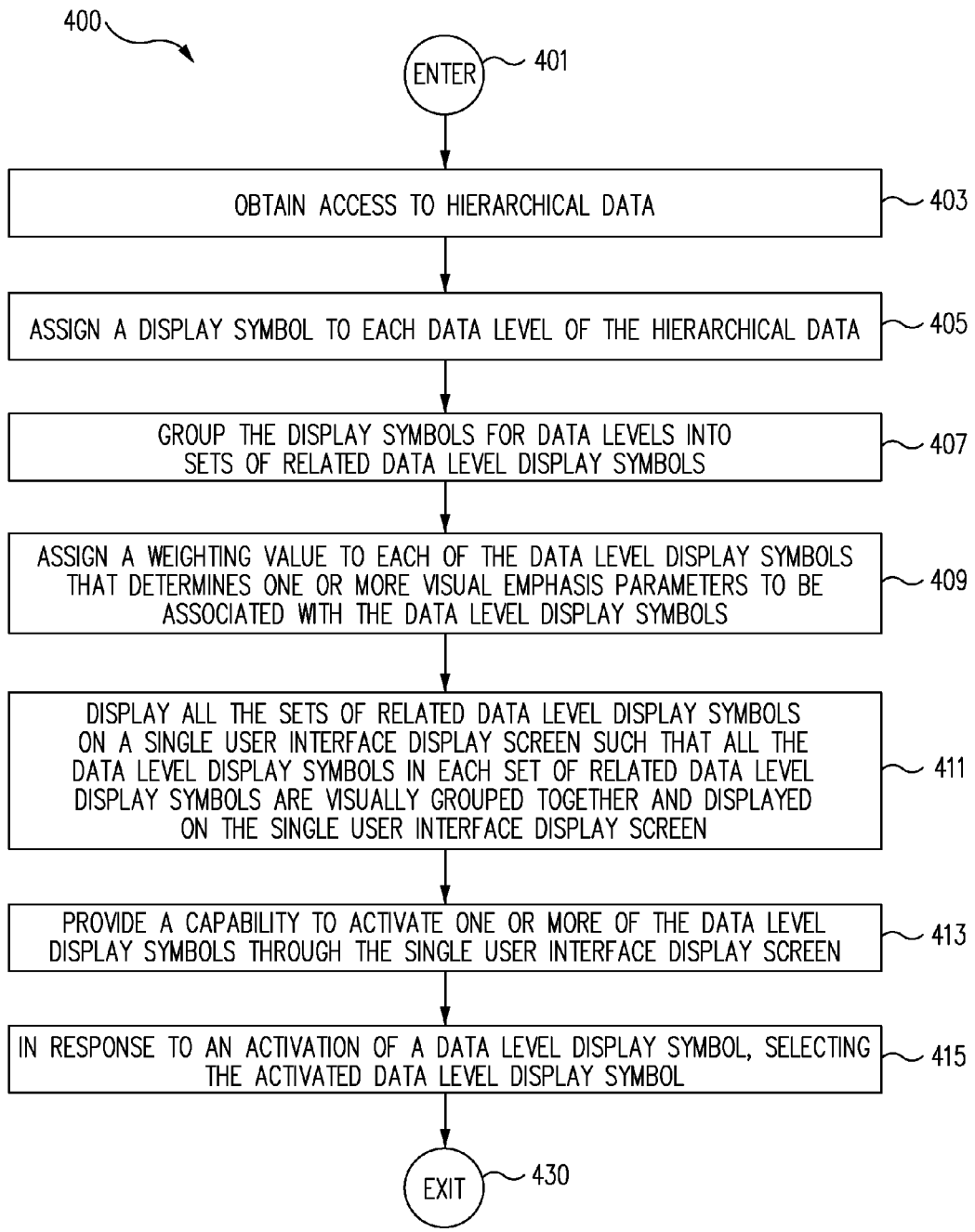
FIG. 4 is a flow chart depicting a process for visually representing and selecting hierarchical data in accordance with one embodiment.

FIG. 4 is a flow chart depicting a process 400 for visually representing and selecting hierarchical data in accordance with one embodiment. Process 400 for visually representing and selecting hierarchical data begins at ENTER OPERATION 401 of FIG. 4 and process flow proceeds to OBTAIN ACCESS TO HIERARCHICAL DATA OPERATION 403.

In one embodiment, at OBTAIN ACCESS TO HIERARCHICAL DATA OPERATION 403 process 400 for visually representing and selecting hierarchical data obtains access to hierarchical data, the hierarchical data being arranged in a one to many, e.g., parent/child, data structure with two or more data levels.

As noted above, one way data is currently arranged for relative ease of access is as hierarchical data. Hierarchical data is typically arranged in parent/child data levels, also known as a "one to many" data arrangement. This type of data arrangement has proven extremely useful and particularly intuitive for systems such as, but not limited to, data categorization systems, such as menu-based systems; financial transaction categorization systems; geo-location and positional systems; audio file organizational systems, such as, but not limited to, playlists; video file organization systems, such as, but not limited to, video library and menu systems; and numerous other systems or situations where large amounts of data needs to be accessed in an efficient and intuitive way.

As also noted above, while hierarchical data arrangements have proven very effective, one long-standing problem associated with hierarchical data arrangements is the fact that, currently, hierarchical data is typically arranged in lists of parent data levels with one or more child data levels associated with each parent data level displayed in an outline-like, linear, and static display structure.

For relatively small amounts of data, and relatively few parent and child data levels, the system is sufficient. However, when larger numbers of data levels are present, or when a display screen is of limited size, current implementations of hierarchical data often results in considerable user input, often in the form of the user having to scroll through multiple user interface display screens, to view all, or a sufficient number of, the data levels.

In one embodiment, once process 400 for visually representing and selecting hierarchical data obtains access to hierarchical data at OBTAIN ACCESS TO HIERARCHICAL DATA OPERATION 403, process flow proceeds to ASSIGN A DISPLAY SYMBOL TO EACH DATA LEVEL OF THE HIERARCHICAL DATA OPERATION 405.

In one embodiment, at ASSIGN A DISPLAY SYMBOL TO EACH DATA LEVEL OF THE HIERARCHICAL DATA OPERATION 405, data levels within the hierarchical data of OBTAIN ACCESS TO HIERARCHICAL DATA OPERATION 403 are identified and each data level within the hierarchical data is assigned a display symbol.

In various embodiments, the assigned display symbols of ASSIGN A DISPLAY SYMBOL TO EACH DATA LEVEL OF THE HIERARCHICAL DATA OPERATION 405 include, but are not limited to, one or more alpha numeric symbols representing the name, or content, of the data level within the hierarchical data.

In other embodiments, the assigned display symbols of ASSIGN A DISPLAY SYMBOL TO EACH DATA LEVEL OF THE HIERARCHICAL DATA OPERATION 405 can be any symbol, icon, or other visual feature, as discussed herein, and/or as known in the art at the time of filing, and/or as developed after the time of filing.

In one embodiment, once data levels within the hierarchical data are identified and each data level within the hierarchical data is assigned a display symbol at ASSIGN A DISPLAY SYMBOL TO EACH DATA LEVEL OF THE HIERARCHICAL DATA OPERATION 405, process flow proceeds to GROUP THE DISPLAY SYMBOLS FOR DATA LEVELS INTO SETS OF RELATED DATA LEVEL DISPLAY SYMBOLS OPERATION 407.

In one embodiment, at GROUP THE DISPLAY SYMBOLS FOR DATA LEVELS INTO SETS OF RELATED DATA LEVEL DISPLAY SYMBOLS OPERATION 407 the data level display symbols of ASSIGN A DISPLAY SYMBOL TO EACH DATA LEVEL OF THE HIERARCHICAL DATA OPERATION 405 representing types, or levels, of hierarchical data, e.g., child data levels, associated with a common parent data level, are identified and grouped into sets of related data level display symbols.

As discussed below, the related data level display symbols in each set of related data level display symbols are marked, or linked, for display in the same general location on a user interface display screen.

In one embodiment, once the data level display symbols of ASSIGN A DISPLAY SYMBOL TO EACH DATA LEVEL OF THE HIERARCHICAL DATA OPERATION 405 representing types or levels of hierarchical data, e.g., child data levels associated with a common parent data level, are identified and grouped into sets of related data level display symbols at GROUP THE DISPLAY SYMBOLS FOR DATA LEVELS INTO SETS OF RELATED DATA LEVEL DISPLAY SYMBOLS OPERATION 407, process flow proceeds to ASSIGN A WEIGHTING VALUE TO EACH OF THE DATA LEVEL DISPLAY SYMBOLS THAT DETERMINES ONE OR MORE VISUAL EMPHASIS PARAMETERS TO BE ASSOCIATED WITH THE DATA LEVEL DISPLAY SYMBOLS OPERATION 409.

In one embodiment, at ASSIGN A WEIGHTING VALUE TO EACH OF THE DATA LEVEL DISPLAY SYMBOLS THAT DETERMINES ONE OR MORE VISUAL EMPHASIS PARAMETERS TO BE ASSOCIATED WITH THE DATA LEVEL DISPLAY SYMBOLS OPERATION 409 each of the data level display symbols of ASSIGN A DISPLAY SYMBOL TO EACH DATA LEVEL OF THE HIERARCHICAL DATA OPERATION 405 within each set of related data level display symbols of GROUP THE DISPLAY SYMBOLS FOR DATA LEVELS INTO SETS OF RELATED DATA LEVEL DISPLAY SYMBOLS OPERATION 407 is assigned a weighting value.

In one embodiment, the weighting value to be assigned to a given data level display symbol is calculated at ASSIGN A WEIGHTING VALUE TO EACH OF THE DATA LEVEL DISPLAY SYMBOLS THAT DETERMINES ONE OR MORE VISUAL EMPHASIS PARAMETERS TO BE ASSOCIATED WITH THE DATA LEVEL DISPLAY SYMBOLS OPERATION 409 based, at least in part, on how many, if any, child data levels are associated with the data level represented by the given data level display symbol, i.e., how many data levels claim the data level represented by the given data level display symbol as a parent data level.

For instance, as a specific illustrative example, the weighting value to be assigned to a given data level display symbol at ASSIGN A WEIGHTING VALUE TO EACH OF THE DATA LEVEL DISPLAY SYMBOLS THAT DETERMINES ONE OR MORE VISUAL EMPHASIS PARAMETERS TO BE ASSOCIATED WITH THE DATA LEVEL DISPLAY SYMBOLS OPERATION 409 is larger if the given data level display symbol has several child data level display symbols than if the given data level display symbol has fewer, or no, child data level display symbols.

In one embodiment, the weighting value to be assigned to a given data level display symbol is calculated at ASSIGN A WEIGHTING VALUE TO EACH OF THE DATA LEVEL DISPLAY SYMBOLS THAT DETERMINES ONE OR MORE VISUAL EMPHASIS PARAMETERS TO BE ASSOCIATED WITH THE DATA LEVEL DISPLAY SYMBOLS OPERATION 409 based, at least in part, on how many times the given data level display symbol has been chosen as the desired data level display symbol by one or more users of process 400 for visually representing and selecting hierarchical data.

For instance, as a specific illustrative example, in one embodiment, historical use data is gathered and maintained indicating how many times each data level display symbol is selected by a group of users of process 400 for visually representing and selecting hierarchical data. Then, in one embodiment, the weighting value to be assigned to a given data level display symbol at ASSIGN A WEIGHTING VALUE TO EACH OF THE DATA LEVEL DISPLAY SYMBOLS THAT DETERMINES ONE OR MORE VISUAL EMPHASIS PARAMETERS TO BE ASSOCIATED WITH THE DATA LEVEL DISPLAY SYMBOLS OPERATION 409 is larger for a given data level display symbol that has been selected as the desired data level display symbol relatively frequently and smaller for a given data level display symbol that has been selected as the desired data level display symbol less frequently.

As another specific illustrative example, in one embodiment, historical use data is gathered and maintained indicating how many times each data level display symbol is selected by a particular user of process 400 for visually representing and selecting hierarchical data, such as the current user of process 400 for visually representing and selecting hierarchical data. Then, in one embodiment, the weighting value to be assigned to a given data level display symbol at ASSIGN A WEIGHTING VALUE TO EACH OF THE DATA LEVEL DISPLAY SYMBOLS THAT DETERMINES ONE OR MORE VISUAL EMPHASIS PARAMETERS TO BE ASSOCIATED WITH THE DATA LEVEL DISPLAY SYMBOLS OPERATION 409 is larger for a given data level display symbol that has been selected as the desired data level display symbol relatively frequently and smaller for a given data level display symbol that has been selected as the desired data level display symbol less frequently.

In one embodiment, the weighting value to be assigned to a given data level display symbol is calculated at ASSIGN A WEIGHTING VALUE TO EACH OF THE DATA LEVEL DISPLAY SYMBOLS THAT DETERMINES ONE OR MORE VISUAL EMPHASIS PARAMETERS TO BE ASSOCIATED WITH THE DATA LEVEL DISPLAY SYMBOLS OPERATION 409 based, at least in part, on profile data collected and maintained for the current user of process 400 for visually representing and selecting hierarchical data.

For instance, as a specific illustrative example, in one embodiment, profile data is collected and/or obtained indicating the user's preferences, interests, and likely uses of process 400 for visually representing and selecting hierarchical data. As a more specific illustrative example, assume profile data is obtained indicating a given user is an avid scuba diver and frequently travels to Monterey Calif. for diving. In this instance, if a parent data level symbol is "recreation" and child data level symbols are "hiking", "fishing", and "bicycling" and "scuba", then in this specific illustrative example, the child data level symbol "scuba" is given a higher weighting value at ASSIGN A WEIGHTING VALUE TO EACH OF THE DATA LEVEL DISPLAY SYMBOLS THAT DETERMINES ONE OR MORE VISUAL EMPHASIS PARAMETERS TO BE ASSOCIATED WITH THE DATA LEVEL DISPLAY SYMBOLS OPERATION 409, perhaps even higher than the weighting value assigned to the parent data level symbol "recreation."

As another specific illustrative example, assume the parent data level symbol is "travel" and a first child data level symbol is "Monterey" and two second child data level symbols under "Monterey" are "business" and "personal." Then, in this specific illustrative example, the second level child data level symbol "personal" is given a higher weighting value at ASSIGN A WEIGHTING VALUE TO EACH OF THE DATA LEVEL DISPLAY SYMBOLS THAT DETERMINES ONE OR MORE VISUAL EMPHASIS PARAMETERS TO BE ASSOCIATED WITH THE DATA LEVEL DISPLAY SYMBOLS OPERATION 409, perhaps even higher than the weighting value assigned to the parent data level symbols "Monterey" or "travel".

In one embodiment, the weighting value to be assigned to a given data level display symbol is calculated at ASSIGN A WEIGHTING VALUE TO EACH OF THE DATA LEVEL DISPLAY SYMBOLS THAT DETERMINES ONE OR MORE VISUAL EMPHASIS PARAMETERS TO BE ASSOCIATED WITH THE DATA LEVEL DISPLAY SYMBOLS OPERATION 409 based, at least in part, on contextual data for the current user of process 400 for visually representing and selecting hierarchical data.

For instance, as a specific illustrative example, in one embodiment, assume a financial management system uses process 400 for visually representing and selecting hierarchical data to display potential financial transaction categories for an uncategorized financial transaction, with each data level display symbol representing a potential categorization. Further assume a currently selected financial transaction shows "Bob's Grill Emporium" as the payee of the financial transaction. In this specific illustrative example, the data level display symbol "Shopping" (for grills) and data level display symbol "Restaurants" (for bar & grill) are assigned higher weighting values at ASSIGN A WEIGHTING VALUE TO EACH OF THE DATA LEVEL DISPLAY SYMBOLS THAT DETERMINES ONE OR MORE VISUAL EMPHASIS PARAMETERS TO BE ASSOCIATED WITH THE DATA LEVEL DISPLAY SYMBOLS OPERATION 409 than other data level display symbols.

In various embodiments, any combination of the above methods for calculating a weighting value to be assigned to a given data level display symbol are used at ASSIGN A WEIGHTING VALUE TO EACH OF THE DATA LEVEL DISPLAY SYMBOLS THAT DETERMINES ONE OR MORE VISUAL EMPHASIS PARAMETERS TO BE ASSOCIATED WITH THE DATA LEVEL DISPLAY SYMBOLS OPERATION 409. In various embodiments, any other methods for calculating a weighting value to be assigned to a given data level display symbol are used at ASSIGN A WEIGHTING VALUE TO EACH OF THE DATA LEVEL DISPLAY SYMBOLS THAT DETERMINES ONE OR MORE VISUAL EMPHASIS PARAMETERS TO BE ASSOCIATED WITH THE DATA LEVEL DISPLAY SYMBOLS OPERATION 409.

In one embodiment, the weighting value assigned to a particular data level display symbol at ASSIGN A WEIGHTING VALUE TO EACH OF THE DATA LEVEL DISPLAY SYMBOLS THAT DETERMINES ONE OR MORE VISUAL EMPHASIS PARAMETERS TO BE ASSOCIATED WITH THE DATA LEVEL DISPLAY SYMBOLS OPERATION 409 determines one or more visual emphasis parameters to be associated with that data level display symbol.

In various embodiments, the visual emphasis parameters are used to visually highlight selected data level display symbols on a user interface display screen, as discussed in more detail below.

In one embodiment, the visual emphasis parameters dictate the size of the data level display symbols that will appear on the user interface display screen. For instance, in one embodiment, the larger the weighting value assigned to a data level display symbol at ASSIGN A WEIGHTING VALUE TO EACH OF THE DATA LEVEL DISPLAY SYMBOLS THAT DETERMINES ONE OR MORE VISUAL EMPHASIS PARAMETERS TO BE ASSOCIATED WITH THE DATA LEVEL DISPLAY SYMBOLS OPERATION 409, the larger the data level display symbol will appear on the user interface display screen.

In one embodiment, the visual emphasis parameters dictate the color of the data level display symbols that will appear on the user interface display screen. For instance, in one embodiment, a larger weighting value assigned to a data level display symbol at ASSIGN A WEIGHTING VALUE TO EACH OF THE DATA LEVEL DISPLAY SYMBOLS THAT DETERMINES ONE OR MORE VISUAL EMPHASIS PARAMETERS TO BE ASSOCIATED WITH THE DATA LEVEL DISPLAY SYMBOLS OPERATION 409 results in a brighter, or designated, display color for the data level display symbol on the user interface display screen.

In one embodiment, the visual emphasis parameters dictate the font of the data level display symbols that will appear on the user interface display screen. For instance, in one embodiment, a larger weighting value assigned to a data level display symbol at ASSIGN A WEIGHTING VALUE TO EACH OF THE DATA LEVEL DISPLAY SYMBOLS THAT DETERMINES ONE OR MORE VISUAL EMPHASIS PARAMETERS TO BE ASSOCIATED WITH THE DATA LEVEL DISPLAY SYMBOLS OPERATION 409 results in a highlighted, or designated, font for the data level display symbol on the user interface display screen.

In one embodiment, the visual emphasis parameters dictate animation of the data level display symbols that will appear on the user interface display screen. For instance, in one embodiment, a larger weighting value assigned to a data level display symbol at ASSIGN A WEIGHTING VALUE TO EACH OF THE DATA LEVEL DISPLAY SYMBOLS THAT DETERMINES ONE OR MORE VISUAL EMPHASIS PARAMETERS TO BE ASSOCIATED WITH THE DATA LEVEL DISPLAY SYMBOLS OPERATION 409 results in a moving, or otherwise animated, data level display symbol on the user interface display screen.

In one embodiment, the visual emphasis parameters dictate the display position of the data level display symbols on the user interface display screen. For instance, in one embodiment, a larger weighting value assigned to a data level display symbol at ASSIGN A WEIGHTING VALUE TO EACH OF THE DATA LEVEL DISPLAY SYMBOLS THAT DETERMINES ONE OR MORE VISUAL EMPHASIS PARAMETERS TO BE ASSOCIATED WITH THE DATA LEVEL DISPLAY SYMBOLS OPERATION 409 results in a centralized, or dedicated, position for the data level display symbol on the user interface display screen.

In various embodiments, the visual emphasis parameters dictate any other visually distinguishing features to be associated with data level display symbols on the user interface display screen, as discussed herein, and/or as known/made available in the art at the time of filing, and/or as developed after the time of filing.

In one embodiment, once each of the data level display symbols within each set of related data level display symbols is assigned a weighting value, and corresponding visual emphasis parameters are applied, at ASSIGN A WEIGHTING VALUE TO EACH OF THE DATA LEVEL DISPLAY SYMBOLS THAT DETERMINES ONE OR MORE VISUAL EMPHASIS PARAMETERS TO BE ASSOCIATED WITH THE DATA LEVEL DISPLAY SYMBOLS OPERATION 409, process flow proceeds to DISPLAY ALL THE SETS OF RELATED DATA LEVEL DISPLAY SYMBOLS ON A SINGLE USER INTERFACE DISPLAY SCREEN SUCH THAT ALL THE DATA LEVEL DISPLAY SYMBOLS IN EACH SET OF RELATED DATA LEVEL DISPLAY SYMBOLS ARE VISUALLY GROUPED TOGETHER AND DISPLAYED ON THE SINGLE USER INTERFACE DISPLAY SCREEN OPERATION 411.

In one embodiment, at DISPLAY ALL THE SETS OF RELATED DATA LEVEL DISPLAY SYMBOLS ON A SINGLE USER INTERFACE DISPLAY SCREEN SUCH THAT ALL THE DATA LEVEL DISPLAY SYMBOLS IN EACH SET OF RELATED DATA LEVEL DISPLAY SYMBOLS ARE VISUALLY GROUPED TOGETHER AND DISPLAYED ON THE SINGLE USER INTERFACE DISPLAY SCREEN OPERATION 411, once sets of related data level display symbols are identified and weighting values are assigned to each data level display symbol in each set of related data level display symbols to determine visual emphasis parameters for each data level display symbol in each set of related data level display symbols, all the sets of related data level display symbols are displayed on a single user interface display screen.

In one embodiment, at DISPLAY ALL THE SETS OF RELATED DATA LEVEL DISPLAY SYMBOLS ON A SINGLE USER INTERFACE DISPLAY SCREEN SUCH THAT ALL THE DATA LEVEL DISPLAY SYMBOLS IN EACH SET OF RELATED DATA LEVEL DISPLAY SYMBOLS ARE VISUALLY GROUPED TOGETHER AND DISPLAYED ON THE SINGLE USER INTERFACE DISPLAY SCREEN OPERATION 411 all the data level display symbols are sized so that all of the data level display symbols can be displayed in a single user interface display screen.

In one embodiment, at DISPLAY ALL THE SETS OF RELATED DATA LEVEL DISPLAY SYMBOLS ON A SINGLE USER INTERFACE DISPLAY SCREEN SUCH THAT ALL THE DATA LEVEL DISPLAY SYMBOLS IN EACH SET OF RELATED DATA LEVEL DISPLAY SYMBOLS ARE VISUALLY GROUPED TOGETHER AND DISPLAYED ON THE SINGLE USER INTERFACE DISPLAY SCREEN OPERATION 411 all the data level display symbols in each set of related data level display symbols are visually grouped together on the single user interface display screen and displayed in accordance with their assigned weighting value and associated visual emphasis parameters.

As a specific illustrative example, in one embodiment, at DISPLAY ALL THE SETS OF RELATED DATA LEVEL DISPLAY SYMBOLS ON A SINGLE USER INTERFACE DISPLAY SCREEN SUCH THAT ALL THE DATA LEVEL DISPLAY SYMBOLS IN EACH SET OF RELATED DATA LEVEL DISPLAY SYMBOLS ARE VISUALLY GROUPED TOGETHER AND DISPLAYED ON THE SINGLE USER INTERFACE DISPLAY SCREEN OPERATION 411 data level display symbols representing parent or "top" data levels are sorted alphabetically from top to bottom on the user interface display screen with the data level display symbols representing child, or "lower" data levels scattered, or clustered, around the general location on the user interface display screen of the data level display symbols representing their respective parent or "top" data levels.

As noted above, in one illustrative embodiment, if a data level display symbol has been previously selected, its visual prominence (size) is increased in the user interface display screen, even to the point where it can become bigger than the data level display symbols representing its respective parent or "top" data level. As an even more specific illustrative example, if the data level display symbol "Gas", which represents a data level that is a child with respect to the data level display symbol "Auto & Transport", is often selected by a user, then the data level display symbol "Gas" can actually be displayed in the user interface display screen larger than the data level display symbol "Auto & Transport."

As also noted above, color can be used to emphasize, or de-emphasize, certain data level display symbols in the user interface display screen. As a specific illustrative example, if the data level display symbol "Classical" is rarely chosen as an audio file category in an audio file menu, then, in one illustrative example, the data level display symbol "Classical" can not only be displayed as a smaller data level display symbol, but also as a lighter, or grayed out, data level display symbol.

Figure 5:
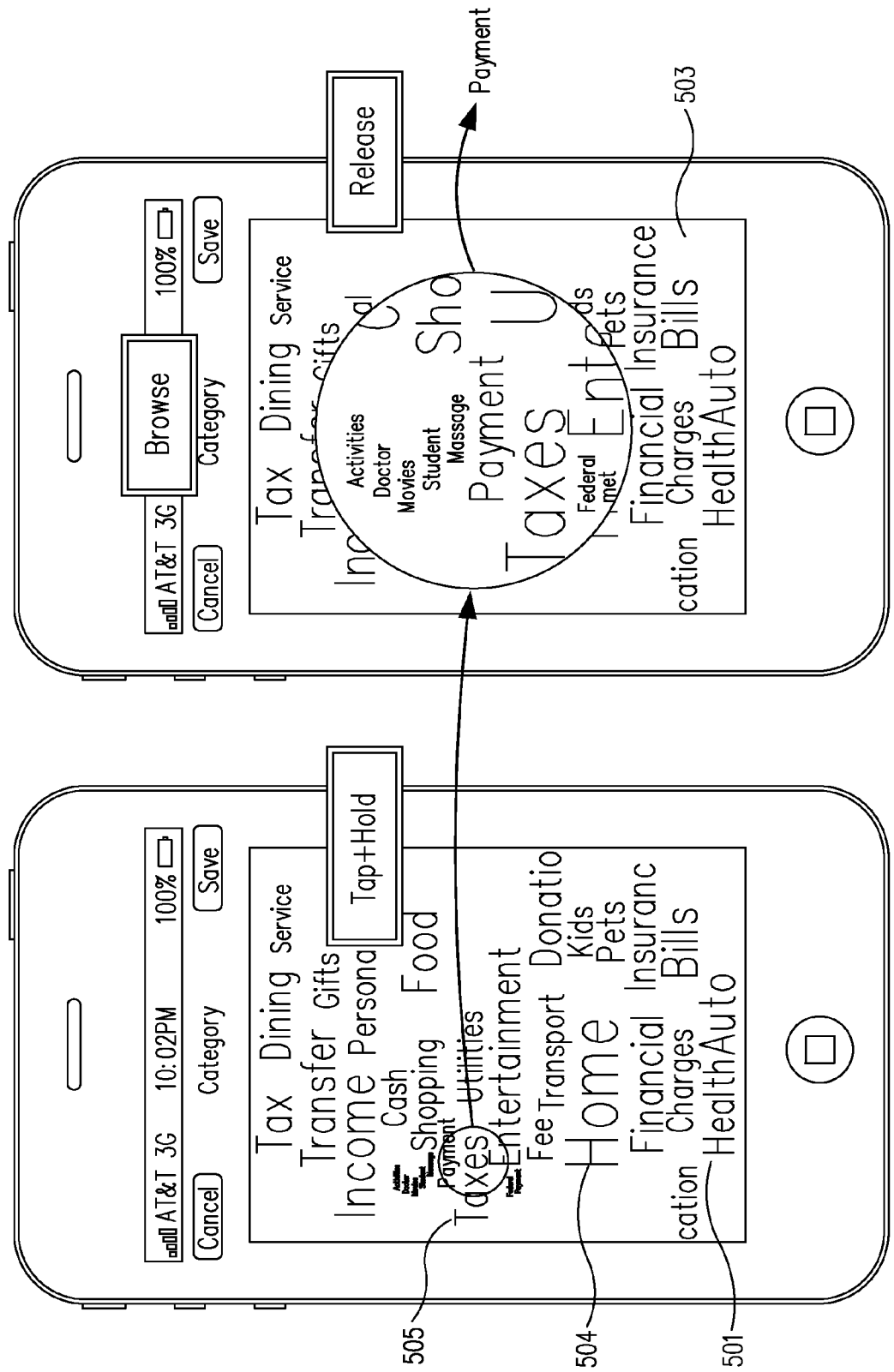
FIG. 5 shows a user interface display screen before and after a data level display symbol has been activated/selected in accordance with one embodiment.

FIG. 5 shows a user interface display screen 501 (before) and user interface display screen 503 (after) a data level display symbol 505 has been activated/selected in accordance with one embodiment.

In particular, user interface display screen 501 shows all the data level display symbols in each set of related data level display symbols visually grouped together on the single user interface display screen 501 and displayed in accordance with their assigned weighting value and associated visual emphasis parameters.

For instance, as seen in FIG. 5, user interface display screen 501 includes the parent data level display symbol "Home" 504 displayed as a relatively large data level display symbol surrounded by child data level display symbols "Kids", "Pets", "Bills", "Insurance", etc., with smaller data level display symbols of varying size and color. Likewise the parent data level display symbol "Taxes" 505 is displayed as a relatively large data level display symbol surrounded by child data level display symbols "payment", "federal", etc., with smaller data level display symbols of varying size and color.

Returning to FIG. 4, in one embodiment, once all the sets of related data level display symbols are displayed on a single user interface display screen at DISPLAY ALL THE SETS OF RELATED DATA LEVEL DISPLAY SYMBOLS ON A SINGLE USER INTERFACE DISPLAY SCREEN SUCH THAT ALL THE DATA LEVEL DISPLAY SYMBOLS IN EACH SET OF RELATED DATA LEVEL DISPLAY SYMBOLS ARE VISUALLY GROUPED TOGETHER AND DISPLAYED ON THE SINGLE USER INTERFACE DISPLAY SCREEN OPERATION 411, process flow proceeds to PROVIDE A CAPABILITY TO ACTIVATE ONE OR MORE OF THE DATA LEVEL DISPLAY SYMBOLS THROUGH THE SINGLE USER INTERFACE DISPLAY SCREEN OPERATION 413.

In one embodiment, at PROVIDE A CAPABILITY TO ACTIVATE ONE OR MORE OF THE DATA LEVEL DISPLAY SYMBOLS THROUGH THE SINGLE USER INTERFACE DISPLAY SCREEN OPERATION 413 once all data level display symbols are displayed on the user interface display screen at DISPLAY ALL THE SETS OF RELATED DATA LEVEL DISPLAY SYMBOLS ON A SINGLE USER INTERFACE DISPLAY SCREEN SUCH THAT ALL THE DATA LEVEL DISPLAY SYMBOLS IN EACH SET OF RELATED DATA LEVEL DISPLAY SYMBOLS ARE VISUALLY GROUPED TOGETHER AND DISPLAYED ON THE SINGLE USER INTERFACE DISPLAY SCREEN OPERATION 411, any of the data level display symbols can then be activated through the user interface display screen.

In one embodiment, at PROVIDE A CAPABILITY TO ACTIVATE ONE OR MORE OF THE DATA LEVEL DISPLAY SYMBOLS THROUGH THE SINGLE USER INTERFACE DISPLAY SCREEN OPERATION 413 the data level display symbols can be activated using any user interface device such as, but not limited to, a touch screen, stylus, keyboard, voice command, or any other procedure, process, or mechanism, for translating user actions into one or more processor instructions and/or actions, as discussed herein, and/or as known/available in the art at the time of filing, and/or as developed/made available after the time of filing.

In one embodiment, once all of the data level display symbols are displayed for activation through the user interface display screen, and at least one data level display symbol is activated at PROVIDE A CAPABILITY TO ACTIVATE ONE OR MORE OF THE DATA LEVEL DISPLAY SYMBOLS THROUGH THE SINGLE USER INTERFACE DISPLAY SCREEN OPERATION 413, process flow proceeds to IN RESPONSE TO AN ACTIVATION OF A DATA LEVEL DISPLAY SYMBOL, SELECT THE ACTIVATED DATA LEVEL DISPLAY SYMBOL OPERATION 415.

In one embodiment, at IN RESPONSE TO AN ACTIVATION OF A DATA LEVEL DISPLAY SYMBOL, SELECT THE ACTIVATED DATA LEVEL DISPLAY SYMBOL OPERATION 415 in response to an activation of a data level display symbol at PROVIDE A CAPABILITY TO ACTIVATE ONE OR MORE OF THE DATA LEVEL DISPLAY SYMBOLS THROUGH THE SINGLE USER INTERFACE DISPLAY SCREEN OPERATION 413, the activated data level display symbol is selected.

In one embodiment, when a data level display symbol is activated at PROVIDE A CAPABILITY TO ACTIVATE ONE OR MORE OF THE DATA LEVEL DISPLAY SYMBOLS THROUGH THE SINGLE USER INTERFACE DISPLAY SCREEN OPERATION 413 by, for instance, a single "Tap and Release" action, then at IN RESPONSE TO AN ACTIVATION OF A DATA LEVEL DISPLAY SYMBOL, SELECT THE ACTIVATED DATA LEVEL DISPLAY SYMBOL OPERATION 415 that data level display symbol is immediately selected.

In one embodiment, when a data level display symbol is activated at PROVIDE A CAPABILITY TO ACTIVATE ONE OR MORE OF THE DATA LEVEL DISPLAY SYMBOLS THROUGH THE SINGLE USER INTERFACE DISPLAY SCREEN OPERATION 413 by, for instance, a "Tap and Hold" action, that data level display symbol, and all, or part, of the surrounding related data level display symbols in the same set of related data level display symbols is zoomed in on in the user interface display screen to provide a more granular, and/or larger, view. Then, the user can place the cursor over a desired data level display symbol and perform a "Release" action to select the desired data level display symbol.

As noted above, FIG. 5 shows a user interface display screen 501 (before) and user interface display screen 503 (after) a data level display symbol 505 has been activated/selected in accordance with one embodiment.

In particular, user interface display screen 501 shows all the data level display symbols in each set of related data level display symbols visually grouped together on the single user interface display screen 501 and displayed in accordance with their assigned weighting value and associated visual emphasis parameters. In addition, FIG. 5, shows user interface display screen 501 with the parent data level symbol "Tax" 505 having been activated by a "Tap and Hold" action.

As seen in FIG. 5, the "Tap and Hold" action in user interface display screen 501, results in the activated "Tax" 505 data level display symbol, and the surrounding related child data level display symbols "payment" and "Federal" in the same set of related data level display symbols, being zoomed in on in user interface display screen 503 to provide a more granular, and/or larger, view. Then, the user can browse and place the cursor over a desired data level display symbol, in this example, the "Payment" related data level display symbol and perform a "Release" action to select the desired "Payment" related data level display symbol.

In one embodiment, at PROVIDE A CAPABILITY TO ACTIVATE ONE OR MORE OF THE DATA LEVEL DISPLAY SYMBOLS THROUGH THE SINGLE USER INTERFACE DISPLAY SCREEN OPERATION 413 the user can also "Drag and Drop" data level display symbols into a new general area of the user interface display screen to either select a more specific data level display symbol or to add a data level display symbol to a different set of related data level display symbols.

In various embodiments, the data level display symbols, and sets of related data level display symbols, can be manipulated in any way desired by the user and/or the provider of process 400 for visually representing and selecting hierarchical data, as discussed herein, and/or as known in the art at the time of filing, and/or as developed after the time of filing.

In one embodiment, process 400 for visually representing and selecting hierarchical data is implemented as a custom iOS control to be embedded into any existing application such as, but not limited to, financial management systems where process 400 for visually representing and selecting hierarchical data can be used to categorize financial transactions; data management systems where process 400 for visually representing and selecting hierarchical data is used to present various menu items, such as, but not limited to, services, invoices, customers, playlists, etc.; payroll management systems where process 400 for visually representing and selecting hierarchical data is used present payroll data by department, location, salary vs. hourly employees, etc.; geo-graphic location and position systems where process 400 for visually representing and selecting hierarchical data can be used to present locations and location categories such as country, state, county, city, postal code, etc.; and/or any other data management systems, as discussed herein, and/or as known in the art at the time of filing, and/or as developed after the time of filing.

In one embodiment, once, in response to an activation of a data level display symbol at PROVIDE A CAPABILITY TO ACTIVATE ONE OR MORE OF THE DATA LEVEL DISPLAY SYMBOLS THROUGH THE SINGLE USER INTERFACE DISPLAY SCREEN OPERATION 413, the activated data level display symbol is selected at IN RESPONSE TO AN ACTIVATION OF A DATA LEVEL DISPLAY SYMBOL, SELECT THE ACTIVATED DATA LEVEL DISPLAY SYMBOL OPERATION 415, process flow proceeds to EXIT OPERATION 430.

In one embodiment, at EXIT OPERATION 430, process 400 for visually representing and selecting hierarchical data is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process 400 for visually representing and selecting hierarchical data, data level display symbols representing all data levels of hierarchical data are displayed in a single user interface display screen with sets of related data level display symbols being displayed in the same portion of the user interface display screen, and with selected data level display symbols being visually emphasized in the single user interface display screen. Consequently, process 400 for visually representing and selecting hierarchical data provides a user with a single display of all the hierarchical data and the capability to select the desired hierarchical data, in one embodiment, by a single tap of the data level display symbol representing the desired hierarchical data.

As a result, process 400 for visually representing and selecting hierarchical data provides a mechanism for displaying and selecting hierarchical data that is efficient, intuitive, and that is well suited to mobile computing systems with their restricted screen space and often limited user interface capabilities.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "alerting", "applying", "analyzing", "assigning", "associating", "calculating", "capturing", "categorizing", "classifying", "comparing", "creating", "defining", "detecting", "determining", "displaying", "distributing", "encrypting", "extracting", "filtering", "forwarding", "generating", "grouping", "identifying", "implementing", "informing", "monitoring", "obtaining", "posting", "processing", "providing", "receiving", "requesting", "saving", "selecting", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

The Abstract of the Disclosure is provided to comply with 37 C.F.R., section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computing system implemented method for visually representing and selecting hierarchical data comprising the following, which when executed individually or collectively by any set of one or more processors perform a process comprising:

obtaining access to hierarchical data, the hierarchical data being arranged in a parent/child data structure with two or more data levels;

assigning a display symbol to each data level, wherein assigned display symbols being symbols, icons, or visual features representing the data level within the hierarchical data;

grouping the display symbols for data levels associated with a common parent data level into sets of related data level display symbols;

determining how often each data level display symbol has historically been selected by a group of users;

within each set of related data level display symbols assigning a weighting value to each of the data level display symbols such that the weighting value assigned to a particular data level display symbol determines one or more visual emphasis parameters to be associated with that data level display symbol, wherein the weighting value assigned to at least one of the data level display symbols is determined based on the determination of how often the at least one data level display symbol has historically been selected by the group of users;

displaying all the sets of related data level display symbols on a single user interface display screen such that all the data level display symbols in each set of related data level display symbols are visually grouped together and displayed on the user interface display screen;

providing a capability to activate one or more of the data level display symbols through the user interface display screen; and in response to an activation of a data level display symbol, selecting the activated data level display symbol.

2. The computing system implemented method for visually representing and selecting hierarchical data of claim 1 wherein the hierarchical data is selected from the group of hierarchical data consisting of:

data representing data classification categories;
data representing financial transaction classification categories;
data representing geographic locations;
audio file data;
video file data;
playlist data;
positional data;
meta data;
or any combination thereof.

3. The computing system implemented method for visually representing and selecting hierarchical data of claim 1 wherein the display symbol assigned to at least one data level comprises one or more alpha-numeric symbols representing the associated data level.

4. The computing system implemented method for visually representing and selecting hierarchical data of claim 1 wherein the display symbol assigned to at least one data level comprises one or more alpha-numeric symbols representing the name of the associated data level.

5. The computing system implemented method for visually representing and selecting hierarchical data of claim 1 wherein the display symbol assigned to at least one data level comprises one or more alpha-numeric symbols representing the data content of the associated data level.

6. The computing system implemented method for visually representing and selecting hierarchical data of claim 1 wherein the weighting value assigned to at least one of the data level display symbols is determined based on how often the data level display symbol has historically been selected by a current user of the computing system implemented method for visually representing and selecting hierarchical data.

7. The computing system implemented method for visually representing and selecting hierarchical data of claim 1 wherein the weighting value assigned to at least one of the data level display symbols is determined based on profile data associated with a current user of the computing system implemented method for visually representing and selecting hierarchical data.

8. The computing system implemented method for visually representing and selecting hierarchical data of claim 1 wherein the weighting value assigned to at least one of the data level display symbols is determined based on the context in which the data level display symbol is being displayed.

9. The computing system implemented method for visually representing and selecting hierarchical data of claim 1 wherein the one or more visual emphasis parameters to be associated with a data level display symbol includes the size of the data level display symbol.

10. The computing system implemented method for visually representing and selecting hierarchical data of claim 1 wherein the one or more visual emphasis parameters to be associated with a data level display symbol includes the font of the data level display symbol.

11. The computing system implemented method for visually representing and selecting hierarchical data of claim 1 wherein the one or more visual emphasis parameters to be associated with a data level display symbol includes the color of the data level display symbol.

12. The computing system implemented method for visually representing and selecting hierarchical data of claim 1 wherein the one or more visual emphasis parameters to be associated with a data level display symbol includes the position of the data level display symbol on the user interface display screen.

13. The computing system implemented method for visually representing and selecting hierarchical data of claim 1 wherein the one or more visual emphasis parameters to be associated with a data level display symbol includes a defined animation and/or motion of the data level display symbol on the user interface display screen.

14. The computing system implemented method for visually representing and selecting hierarchical data of claim 1 wherein all the sets of related data level display symbols are displayed on a single user interface display screen such that all the data level display symbols in each set of related data level display symbols are visually grouped together and displayed on the user interface display screen as a visual cluster of all the data level display symbols in the set of related data level display symbols.

15. The computing system implemented method for visually representing and selecting hierarchical data of claim 1 wherein in response to an activation of a data level display symbol, the activated data level display symbol is selected and the selected data level display symbol is displayed in an enhanced user interface display screen along with all the data level display symbols in the set of related data level display symbols that includes the selected data level display symbol.

16. A computer program product for visually representing and selecting hierarchical data comprising:

a nontransitory computer readable medium;

and computer program code encoded on the computer readable medium comprising computer readable instructions which, when executed via any set of one or more processors, perform the following:

obtaining access to hierarchical data, the hierarchical data being arranged in a parent/child data structure with two or more data levels;

assigning a display symbol to each data level, wherein assigned display symbols being symbols, icons, or visual features representing the data level within the hierarchical data;

determining how often each data level display symbol has historically been selected by a group of users;

grouping the display symbols for data levels associated with a common parent data level into sets of related data level display symbols;

within each set of related data level display symbols assigning a weighting value to each of the data level display symbols such that the weighting value assigned to a particular data level display symbol determines one or more visual emphasis parameters to be associated with that data level display symbol, wherein the weighting value assigned to at least one of the data level display symbols is determined based on the determination of how often the at least one data level display symbol has historically been selected by the group of users;

displaying all the sets of related data level display symbols on a single user interface display screen such that all the data level display symbols in each set of related data level display symbols are visually grouped together and displayed on the user interface display screen;

providing a capability to activate one or more of the data level display symbols through the user interface display screen; and in response to an activation of a data level display symbol, selecting the activated data level display symbol.

17. The computer program product for visually representing and selecting hierarchical data of claim 16 wherein the hierarchical data is selected from the group of hierarchical data consisting of:
data representing data classification categories;
data representing financial transaction classification categories;
data representing geographic locations;
audio file data;
video file data;
playlist data;
positional data;
meta data;
or any combination thereof.

18. The computer program product for visually representing and selecting hierarchical data of claim 16 wherein the display symbol assigned to at least one data level comprises one or more alpha-numeric symbols representing the associated data level.

19. The computer program product for visually representing and selecting hierarchical data of claim 16 wherein the display symbol assigned to at least one data level comprises one or more alpha-numeric symbols representing the name of the associated data level.

20. The computer program product for visually representing and selecting hierarchical data of claim 16 wherein the display symbol assigned to at least one data level comprises one or more alpha-numeric symbols representing the data content of the associated data level.

21. The computer program product for visually representing and selecting hierarchical data of claim 16 wherein the weighting value assigned to at least one of the data level display symbols is determined based on how often the data level display symbol has historically been selected by a current user of the computing system implemented method for visually representing and selecting hierarchical data.

22. The computer program product for visually representing and selecting hierarchical data of claim 16 wherein the weighting value assigned to at least one of the data level display symbols is determined based on profile data associated with a current user of the computing system implemented method for visually representing and selecting hierarchical data.

23. The computer program product for visually representing and selecting hierarchical data of claim 16 wherein the weighting value assigned to at least one of the data level display symbols is determined based on the context in which the data level display symbol is being displayed.

24. The computer program product for visually representing and selecting hierarchical data of claim 16 wherein the one or more visual emphasis parameters to be associated with a data level display symbol includes the size of the data level display symbol.

25. The computer program product for visually representing and selecting hierarchical data of claim 16 wherein the one or more visual emphasis parameters to be associated with a data level display symbol includes the font of the data level display symbol.

26. The computer program product for visually representing and selecting hierarchical data of claim 16 wherein the one or more visual emphasis parameters to be associated with a data level display symbol includes the color of the data level display symbol.

27. The computer program product for visually representing and selecting hierarchical data of claim 16 wherein the one or more visual emphasis parameters to be associated with a data level display symbol includes the position of the data level display symbol on the user interface display screen.

28. The computer program product for visually representing and selecting hierarchical data of claim 16 wherein the one or more visual emphasis parameters to be associated with a data level display symbol includes a defined animation and/or motion of the data level display symbol on the user interface display screen.

29. The computer program product for visually representing and selecting hierarchical data of claim 16 wherein all the sets of related data level display symbols are displayed on a single user interface display screen such that all the data level display symbols in each set of related data level display symbols are visually grouped together and displayed on the user interface display screen as a visual cluster of all the data level display symbols in the set of related data level display symbols.

30. The computer program product for visually representing and selecting hierarchical data of claim 16 wherein in response to an activation of a data level display symbol, the activated data level display symbol is selected and the selected data level display symbol is displayed in an enhanced user interface display screen along with all the data level display symbols in the set of related data level display symbols that includes the selected data level display symbol.

31. A system for visually representing and selecting hierarchical data comprising:
at least one processor; and
at least one memory coupled to the at least one processor, the at least one memory having stored therein instructions which when executed by any set of the one or more processors, perform a process for visually representing and selecting hierarchical data, the process for visually representing and selecting hierarchical data including:
obtaining access to hierarchical data, the hierarchical data being arranged in a parent/child data structure with two or more data levels;
assigning a display symbol to each data level, wherein assigned display symbols being symbols, icons, or visual features representing the data level within the hierarchical data;
determining how often each data level display symbol has historically been selected by a group of users;
grouping the display symbols for data levels associated with a common parent data level into sets of related data level display symbols;

within each set of related data level display symbols assigning a weighting value to each of the data level display symbols such that the weighting value assigned to a particular data level display symbol determines one or more visual emphasis parameters to be associated with that data level display symbol, wherein the weighting value assigned to at least one of the data level display symbols is determined based on the determination of how often the at least one data level display symbol has historically been selected by the group of users;

displaying all the sets of related data level display symbols on a single user interface display screen such that all the data level display symbols in each set of related data level display symbols are visually grouped together and displayed on the user interface display screen;

providing a capability to activate one or more of the data level display symbols through the user interface display screen; and in response to an activation of a data level display symbol, selecting the activated data level display symbol.

32. The system for visually representing and selecting hierarchical data of claim 31 wherein the hierarchical data is selected from the group of hierarchical data consisting of:

data representing data classification categories;
data representing financial transaction classification categories;
data representing geographic locations;
audio file data;
video file data;
playlist data;
positional data;
meta data;
or any combination thereof.

33. The system for visually representing and selecting hierarchical data of claim 31 wherein the display symbol assigned to at least one data level comprises one or more alpha-numeric symbols representing the associated data level.

34. The system for visually representing and selecting hierarchical data of claim 31 wherein the display symbol assigned to at least one data level comprises one or more alpha-numeric symbols representing the name of the associated data level.

35. The system for visually representing and selecting hierarchical data of claim 31 wherein the display symbol assigned to at least one data level comprises one or more alpha-numeric symbols representing the data content of the associated data level.

36. The system for visually representing and selecting hierarchical data of claim 31 wherein the weighting value assigned to at least one of the data level display symbols is determined based on how often the data level display symbol has historically been selected by a current user of the computing system implemented method for visually representing and selecting hierarchical data.

37. The system for visually representing and selecting hierarchical data of claim 31 wherein the weighting value assigned to at least one of the data level display symbols is determined based on profile data associated with a current user of the computing system implemented method for visually representing and selecting hierarchical data.

38. The system for visually representing and selecting hierarchical data of claim 31 wherein the weighting value assigned to at least one of the data level display symbols is determined based on the context in which the data level display symbol is being displayed.

39. The system for visually representing and selecting hierarchical data of claim 31 wherein the one or more visual emphasis parameters to be associated with a data level display symbol includes the size of the data level display symbol.

40. The system for visually representing and selecting hierarchical data of claim 31 wherein the one or more visual emphasis parameters to be associated with a data level display symbol includes the font of the data level display symbol.

41. The system for visually representing and selecting hierarchical data of claim 31 wherein the one or more visual emphasis parameters to be associated with a data level display symbol includes the color of the data level display symbol.

42. The system for visually representing and selecting hierarchical data of claim 31 wherein the one or more visual emphasis parameters to be associated with a data level display symbol includes the position of the data level display symbol on the user interface display screen.

43. The system for visually representing and selecting hierarchical data of claim 31 wherein the one or more visual emphasis parameters to be associated with a data level display symbol includes a defined animation and/or motion of the data level display symbol on the user interface display screen.

44. The system for visually representing and selecting hierarchical data of claim 31 wherein all the sets of related data level display symbols are displayed on a single user interface display screen such that all the data level display symbols in each set of related data level display symbols are visually grouped together and displayed on the user interface display screen as a visual cluster of all the data level display symbols in the set of related data level display symbols.

45. The system for visually representing and selecting hierarchical data of claim 31 wherein in response to an activation of a data level display symbol, the activated data level display symbol is selected and the selected data level display symbol is displayed in an enhanced user interface display screen along with all the data level display symbols in the set of related data level display symbols that includes the selected data level display symbol.

* * * * *